United States Patent Office 3,068,283
Patented Dec. 11, 1962

3,068,283
(2-PHENYLCYCLOPROPYL)-UREAS, AND 2-PHENYLCYCLOPROPYLCARBAMOYLAMINES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Dec. 5, 1960, Ser. No. 73,593
9 Claims. (Cl. 260—553)

This invention relates to novel 2-phenylcyclopropylureas having valuable pharmacodynamic activity. These compounds have central nervous system activity and in particular are useful as ataractics, sedatives and muscle relaxants.

The novel compounds of this invention are represented by the following structural formula:

FORMULA I

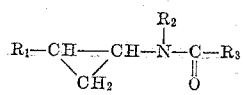

when:

$R_1$ represents phenyl, chlorophenyl, fluorophenyl, trifluoromethylphenyl, lower alkylphenyl, lower alkoxyphenyl, dichlorophenyl, di-lower alkylphenyl, di-lower alkoxyphenyl or methylenedioxyphenyl;

$R_2$ represents hydrogen or lower alkyl; and $R_3$ represents amino, lower alkylamino, di-lower alkylamino, pyrrolidinyl, piperidyl, N-piperazinyl, N'-lower alkyl-N-piperazinyl or N'-hydroxy-lower alkyl-N-piperazinyl.

Advantageous compounds of this invention are represented by the following formula:

FORMULA II

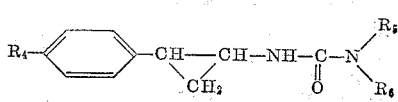

when:

$R_4$ represents hydrogen, chloro, methoxy, methyl or trifluoromethyl; and $R_5$ and $R_6$ represent hydrogen or methyl.

A particularly advantageous and preferred compound is 2-phenylcyclopropylurea.

By the terms "lower alkyl" and "lower alkoxy" where used herein alone or in combination with other terms, groups having from 1 to 4, preferably 1 to 2, carbon atoms are indicated.

The compounds of this invention may be present as cis or trans isomers and also as $d$ or $l$ optical isomers. It is intended to include in this invention all of these isomers, the separated cis and trans isomers and the resolved $d$ and $l$ isomers as well as mixtures of these isomers. At present the trans isomers appear to have particularly advantageous activity and are therefore preferred.

This invention also includes pharmaceutically acceptable salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline, acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The phenylcyclopropylureas of this invention are prepared by reacting a 2-phenylcyclopropylamine with at least one molar equivalent, preferably about a 10% excess, of the appropriate carbamyl chloride derivative. The reaction is carried out in the presence of an acid binding agent such as a tertiary organic amine, for example pyridine or picoline, in an inert hydrocarbon solvent such as benzene or toluene at about 80–125° C., conveniently at the reflux temperature of the solvent for about 1–4 hours. The phenylcyclopropylurea reaction product is isolated by filtering the mixture and evaporating the filtrate to leave the product.

To prepare the phenylcyclopropylureas of Formula I in which $R_2$ is hydrogen, 2-phenylcyclopropylisocyanate is reacted with at least one molar equivalent, preferably with an excess, of ammonia or an appropriately substituted amine. The reaction is preferably carried out by adding the isocyanate in an inert hydrocarbon solvent such as benzene or toluene dropwise to a solution of the amine in the same solvent. The phenylcyclopropylurea reaction product is isolated by concentrating the reaction mixture in vacuo and recrystallizing the residue from a suitable solvent such as water, lower alcohol or ethyl acetate-petroleum ether.

The 2-phenylcyclopropylamine and 2-phenylcyclopropylisocyanate starting materials are either known to the art or are prepared from the appropriately substituted styrene as follows:

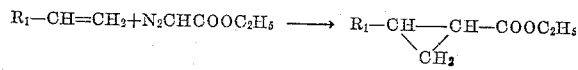

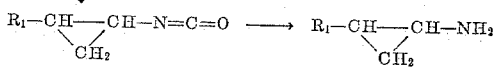

The styrene is condensed with ethyl diazoacetate to give an ethyl 2-phenylcyclopropanecarboxylate which can be fractionally distilled to separate the cis and trans isomeric carboxylates. The carboxylates are saponified by refluxing with an aqueous alcoholic solution of an alkali metal hydroxide such as potassium or sodium hydroxide to give the corresponding carboxylic acids. Alternatively, the isomeric mixture of carboxylates can be saponified as above to give a mixture of carboxylic acids which can be then separated into the cis and trans isomers by fractional crystallization.

An advantageous method for the stereospecific conversion of phenylcyclopropane carboxylic acids to the corresponding isocyanates and amines is to react the carboxylic acid with a lower alkyl haloformate to give the corresponding cyclopropyl mixed anhydride. The reaction is preferably carried out in the presence of an organic base preferably a tertiary amine such as triethylamine at about 0–20° C. in a mixture of water and acetone. The mixed anhydride thus formed is treated with sodium azide to give the corresponding cyclopropyl acid azide. The azide is heated in an inert organic solvent such as toluene or xylene to give, upon removal of the solvent, the corresponding isocyanate. The isocyanate may then be hydrolyzed to give the phenylcyclopropylamine.

Alternatively the cyclopropylcarboxylic acid is converted to the corresponding azide by treating with a chlorinating agent such as thionyl chloride or phosphorus pentachloride and treating the acid chloride with sodium azide. The azide is then converted to the isocyanate and amine starting materials as described above.

The separated trans and cis isomers of the compounds of this invention are prepared by using the appropriate trans or cis phenylcyclopropylamine or isocyanate starting material prepared as described above. To prepare the separated $d$ and $l$ isomers of compounds of this invention, the appropriate $d$ or $l$ phenylcyclopropylamine or isocyanate starting material is used.

The following examples are not limiting but are illustrative of compounds of this invention and the procedures for their preparation.

*Example 1*

A saturated solution of ammonia in 120 ml. of dry benzene is stirred and cooled in an ice bath. Trans-2-phenylcyclopropylisocyanate (15.9 g.) in 50 ml. of benzene is added dropwise. The mixture is saturated with ammonia, then diluted with petroleum ether and filtered. Recrystallization from water gives colorless crystals of trans-2-phenylcyclopropylurea, M.P. 155–157° C. Further recrystallization from 50% aqueous ethanol gives product with melting point of 157–158.5° C.

*Example 2*

A stirred saturated solution of dimethylamine in dry benzene is cooled in an ice bath. A solution of 13.3 g. of trans-2-phenylcyclopropylisocyanate in 50 ml. of dry benzene is added dropwise and the stirring is continued for 15 minutes. Solvent is removed in vacuo and the residue is recrystallized from ethyl acetate-petroleum ether to give colorless needles of trans-N,N-dimethyl-N′-(2-phenylcyclopropyl)urea, M.P. 94–96° C.

*Example 3*

A benzene solution of 15.0 g. of cis-2-phenylcyclopropylisocyanate is added dropwise to a cooled, saturated solution of ammonia in 120 ml. of benzene. The mixture is diluted with petroleum ether and filtered to give crystals of cis-2-phenylcyclopropylurea.

*Example 4*

4-trifluoromethylstyrene (30.0 g.) and 35.0 g. of ethyl diazoacetate are mixed at 0° C. and the mixture gradually heated to 150° C. The reaction is maintained at this temperature for three hours and then the mixture is distilled under reduced pressure. The main fraction is collected which consists of ethyl 2-(4-trifluoromethylphenyl)-cyclopropanecarboxylate.

A solution of 11.5 g. of potassium hydroxide in 12 ml. of water and 50 ml. of 95% ethanol is added to 17.6 g. of ethyl 2-(4-trifluoromethylphenyl)cyclopropanecarboxylate. The solution is refluxed for eight hours, then concentrated, acidified with hydrochloric acid and filtered to give after fractional recrystallization the separated isomeric cis-and trans-2-(4-trifluoromethylphenyl)cyclopropanecarboxylic acids.

To a solution of 2.3 g. of trans-2-(4-trifluoromethylphenyl)cyclopropanecarboxylic acid in 10 ml. of water and 20 ml. of acetone cooled to 0° C. is added 1.3 g. of triethylamine in 15 ml. of acetone. A solution of 1.4 g. of ethyl chloroformate in 20 ml. of acetone is slowly added and the solution then stirred for 30 minutes at 0° C. A solution of 1.2 g. of sodium azide in 15 ml. of water is added dropwise and the stirring continued for one hour. The reaction mixture is poured into ice water and extracted with ether. The extract is evaporated to give the azide. A toluene solution of the azide is heated on a steam bath until the evolution of nitrogen ceases and is then evaporated in vacuo to leave trans-2-(4-trifluoromethylphenyl)cyclopropylisocyanate.

A benzene solution of 2.0 g. of trans-2-(4-trifluoromethylphenyl)cyclopropylisocyanate is added dropwise to a cold benzene solution saturated with amonia. Dilution with petroleum ether and filtration gives trans-2-(4-trifluoromethylphenyl)cyclopropylurea.

*Example 5*

4-chlorostyrene (48.5 g.) and 70.0 g. of ethyl diazoacetate are mixed carefully at 0° C. The mixture is gradually heated to 160° C. and the exothermic reaction is maintained at this temperature by alternate heating and cooling as required. After the initial exothermic reaction is completed, the mixture is held at 160° C. for four hours. The mixture is distilled under reduced pressure and the fraction, B.P. 126–165° C. at 1–2 mm., is collected. The above fraction is redistilled through a 12″ vigreaux column to give two fractions B.P. 121–6° C. at 0.8 mm., which is predominately cis-ethyl 2-(4-chlorophenyl)cyclopropanecarboxylate, and B.P. 136–140° C. at 0.8 mm., which is predominately trans-ethyl 2-(4-chlorophenyl)cyclopropanecarboxylate.

To 7.6 g. of trans-ethyl 2-(4-chlorophenyl)-cyclopropanecarboxylate is added a solution of 5.7 g. of potassium hydroxide in 5.7 ml. of water and 25 ml. of 95% ethanol. The resulting solution is refluxed for four hours and then concentrated in vacuo. The residue is dissolved in 40 ml. of water and the solution adjusted to pH 1 with 10% hydrochloric acid solution. The crystalline precipitate is recrystallized from boiling water to give colorless needles, M.P. 114–116° C., of trans-2-(4-chlorophenyl)cyclopronpanecarboxylic acid.

A mixture of 54.0 g. of trans-2-(4-chlorophenyl)cyclopropanecarboxylic acid and 75 ml. of thionyl chloride is allowed to stand at room temperature for 20 hours. Excess thionyl chloride is removed in vacuo, the last traces being stripped with benzene. The residue is distilled under reduced pressure to give a colorless oil, B.P. 131–133° C. at 1.4 mm., trans-2-(4-chlorophenyl)cyclopropanecarbonyl chloride.

Technical sodium azide (22.5 g.) is covered with 75 ml. of dry toluene and the mixture is heated gradually while a solution of 18.0 g. of trans-2-(4-chlorophenyl)cyclopropanecarbonyl chloride in 75 ml. of dry toluene is added slowly over a period of 15 minutes. The mixture is refluxed for three hours, cooled, and the precipitated salts are filtered. The filtrate is evaporated in vacuo to leave the isocyanate as a red oil.

A cold benzene solution saturated with ammonia is treated with 15.0 g. of trans-2-(4-chlorophenyl)cyclopropyisocyanate. The mixture is stirred for five minutes, then diluted with petroleum ether and filtered to give trans-2-(4-chlorophenyl)cyclopropylurea.

*Example 6*

A benzene solution of 14.7 g. of N-methyl-2-phenylcyclopropylamine, 8.7 g. of carbamyl chloride and 20 ml. of pyridine is heated at reflux for two hours. Filtering the reaction mixture, evaporating the filtrate and recrystallizing the residue from aqueous ethanol gives N-methyl-N-(2-phenylcyclopropyl)urea.

*Example 7*

A mixture of 13.3 g. of 2-phenylcyclopropylamine, 13.7 g. of butyl bromide, 8.0 g. of sodium amide and 100 ml. of toluene is heated at reflux for six hours. Water is added and the organic layer is separated and extracted with dilute hydrochloric acid. The acid extracts are neutralized and extracted with benzene. Removing the benzene in vacuo leaves N-butyl-2-phenylcyclopropylamine.

Ten grams of N-butyl-2-phenylcyclopropylamine in benzene solution is heated at reflux for two hours with 5.0 g. of carbamyl chloride and 25 ml. of pyridine. Filtering, evaporating the filtrate and recrystallizing the residue from aqueous ethanol gives N-butyl-N-(2-phenylcyclopropyl)urea.

Example 8

A benzene solution of 5.5 g. of 2-(2,5-dichlorophenyl)cyclopropylisocyanate (prepared as in Example 4 from 2,5-dichlorostyrene) is added dropwise to a cold saturated solution of ammonia in benzene. Stirring for 10 minutes, evaporating in vacuo and recrystallizing the residue from aqueous ethanol gives 2-(2,5-dichlorophenyl)cyclopropylurea.

Example 9

A mixture of 17.7 g. of 2-(3,4-methylenedioxyphenyl)cyclopropylamine, 10.2 g. of methylcarbamyl chloride, 50 ml. of pyridine and 100 ml. of toluene is refluxed for two hours. Working up as in Example 6 yields N-[2-(3,4-methylenedioxyphenyl)cyclopropyl]-N'-methylurea.

Example 10

A mixture of 1.9 g. of 2-(3,4-dimethoxyphenyl)cyclopropylamine, 1.0 g. of carbamyl chloride, 10 ml. of pyridine and 50 ml. of benzene is heated at reflux for 1.5 hours. Filtering, evaporating and recrystallizing the residue from aqueous ethanol gives 2-(3,4-dimethoxyphenyl)cyclopropylurea.

Example 11

A mixture of 1.6 g. of 2-(4-fluorophenyl)cyclopropylisocyanate (prepared from 4-fluorostyrene by the process of Example 5) and 1.5 g. of dibutylamine in 50 ml. of benzene is stirred for 15 minutes. Evaporating in vacuo and recrystallizing the residue from aqueous ethanol gives N,N-dibutyl-N'-[2-(4-fluorophenyl)cyclopropyl]urea.

Example 12

2-(2-ethylphenyl)cyclopropylisocyanate, prepared as in Example 5 from 2-ethylstyrene, is added dropwise in benzene solution to an excess of a cold saturated solution of ammonia in benzene. Stirring for five minutes, diluting with petroleum ether and filtering gives 2-(2-ethylphenyl)cyclopropylurea.

Example 13

2-(3-tolyl)cyclopropylisocyanate, prepared from 3-tolylstyrene as in Example 5, is suspended in 20% hydrochloric acid solution and the mixture is refluxed with stirring for four hours. The resulting solution is made basic and extracted with ether. Evaporation of the ether leaves 2-(3-tolyl)cyclopropylamine.

Refluxing the above prepared amine with ethyl formate for 12 hours, then concentrating in vacuo leaves N-formyl-2-(3-tolyl)cyclopropylamine which is refluxed with an excess of methyl iodide and sodium amide in diethylene glycol dimethyl ether for six hours, filtering, concentrating, pouring the residue into ice water, extracting with methylene chloride and evaporating the extracts gives N-methyl-2-(3-tolyl)cyclopropylamine.

A mixture of 1.6 g. of N-methyl-2-(3-tolyl)cyclopropylamine, 1.2 g. of dimethylcarbamyl chloride, 15 ml. of picoline and 50 ml. of benzene is heated at reflux for 2.5 hours. Working up as in Example 6 gives N,N-dimethyl-N'-methyl-N'-[2-(3-tolyl)cyclopropyl]-urea.

Example 14

Five grams of 2-(2,4-xylyl)cyclopropylisocyanate (prepared as in Example 5 from 2,4-dimethylstyrene) in benzene solution is added dropwise to a cold benzene solution of pyrrolidine. Stirring for 15 minutes, evaporating in vacuo and recrystallizing the residue from aqueous ethanol gives N-(1-pyrrolidinecarbonyl)-2-phenylcyclopropylamine.

Example 15

A benzene solution of 2.5 g. of 2-(4-butylphenyl)cyclopropylisocyanate (made as in Example 5 from 4-butylstyrene) is added dropwise to a benzene solution of piperidine. Stirring for 10 minutes, evaporating in vacuo and recrystallizing the residue gives N-(1-piperidinecarbonyl)-2-phenylcyclopropylamine.

Example 16

A cold saturated solution of ammonia in 100 ml. of benzene is treated with 12.0 g. of 2-(3,4-dichlorophenyl)cyclopropylisocyanate (prepared as in Example 5 from 3,4-dichlorostyrene). After stirring for five minutes, concentrating in vacuo and recrystallizing the residue from aqueous ethanol, 2-(3,4-dichlorophenyl)cyclopropylurea is obtained.

Example 17

Ten grams of 2-phenylcyclopropylisocyanate in benzene solution is added dropwise to an excess of piperazine in benzene. Stirring for 15 minutes and evaporating in vacuo leaves N-(1-piperazinecarbonyl)-2-phenylcyclopropylamine.

Treatment of an ethanol solution of the free base with excess ethereal hydrogen chloride and dilution with ether gives the hydrochloride salt.

Example 18

A toluene solution of trans-2-phenylcyclopropylisocyanate is added dropwise to an excess of 1-hydroxyethylpiperazine in toluene. Working up as in Example 17 gives N-(4-hydroxyethyl-1-piperazinecarbonyl)-2-phenylcyclopropylamine.

An ethyl acetate solution of the free base is treated with excess maleic acid. Concentrating and filtering isolates the maleate salt.

Example 19

Three grams of 2-phenylcyclopropylisocyanate in benzene is added dropwise to 3.5 g. of 1-methylpiperazine in benzene. The resulting mixture is stirred at room temperature for 15 minutes. Evaporating in vacuo and recrystallizing the residue from aqueous ethanol gives N - (4 - methyl - 1 - piperazinecarbonyl) - 2 - phenylcyclopropylamine.

Treating 1.0 g. of the free base in 50 ml. of ethyl acetate with an equivalent amount of citric acid, concentrating and cooling gives the citrate salt.

What is claimed is:

1. A chemical compound having the structural formula:

$$R_1-CH-CH-N-\overset{R_2}{\underset{\underset{O}{\|}}{C}}-R_3$$
$$\diagdown CH_2 \diagup$$

in which $R_1$ is a member selected from the group consisting of phenyl, chlorophenyl, fluorophenyl, trifluoromethylphenyl, lower alkylphenyl, lower alkoxyphenyl, dichlorophenyl, di-lower alkylphenyl, di-lower alkoxyphenyl and methylenedioxyphenyl; $R_2$ is a member selected from the group consisting of hydrogen and lower alkyl; and $R_3$ is a member selected from the group consisting of amino, lower alkylamino, di-lower alkylamino, N-pyrrolidinyl, N-piperidyl, N-piperazinyl, N'-lower alkyl-N-piperazinyl and N'-hydroxy-lower alkyl-N-piperazinyl.

2. A chemical compound having the formula:

$$\langle\bigcirc\rangle-CH-CH-NH-\underset{\underset{O}{\|}}{C}-NH_2$$
$$\diagdown CH_2 \diagup$$

3. A chemical compound having the formula:

$$\langle\bigcirc\rangle-CH-CH-NH-\underset{\underset{O}{\|}}{C}-N\diagup_{R_6}^{R_5}$$
$$\diagdown CH_2 \diagup$$

in which $R_5$ and $R_6$ are lower alkyl.

4. A chemical compound having the formula:

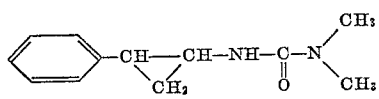

5. A chemical compound having the formula:

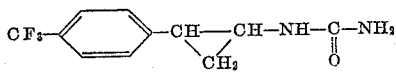

6. A chemical compound having the formula:

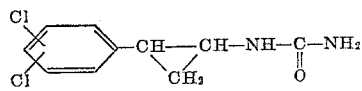

7. A chemical compound having the formula:

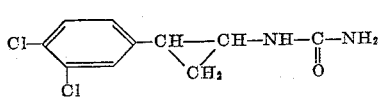

8. A chemical compound having the formula:

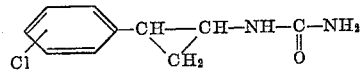

9. Trans-2-phenylcyclopropylurea.

References Cited in the file of this patent

UNITED STATES PATENTS 2,612,522    Duschinsky _____ Sept. 30, 1952

OTHER REFERENCES

Brandy: Rec. Trav. Chem., vol. 37 (1918), pp. 82-3.
Jones et al.: J. Amer. Chem., vol. 48 (1926), page 179.
Morren et al.: Bull. Soc. Chem., Belgium, vol. 59 (1950), page 236.
Papesch et al.: J. Org. Chem., vol. 16 (1951), p. 1881.
Lowy: Org. Chemistry (7th ed., 1951), p. 226.
Close: J. Amer. Chem. Soc., vol. 79 (1957), pp. 1457-8.
Tamchyna et al.: Chem. Abstracts, vol. 52 (1958), col. 8275h.
Yale: J. Med. and Pharm. Chem., vol. 1, No. 2 (1959), p. 121.